United States Patent [19]

Cushing

[11] 4,159,645
[45] Jul. 3, 1979

[54] ELECTROMAGNETIC FLUID FLOW METER WITH TOLERANCE TO SPURIOUS SIGNALS

[75] Inventor: Vincent J. Cushing, Northbrook, Ill.

[73] Assignee: Monitek, Inc., Redwood City, Calif.

[21] Appl. No.: 850,521

[22] Filed: Nov. 11, 1977

[51] Int. Cl.² ............................................. G01F 1/58
[52] U.S. Cl. .......................................... 73/194 EM
[58] Field of Search ................................ 73/194 EM

[56] References Cited

U.S. PATENT DOCUMENTS

| 3,809,070 | 5/1974 | Doll et al. ............... | 73/194 EM X |
| 3,855,858 | 12/1974 | Cushing .................. | 73/194 EM |

Primary Examiner—Charles A. Ruehl
Attorney, Agent, or Firm—Pollock, Vande Sande & Priddy

[57] ABSTRACT

An electromagnetic fluid flow meter includes a probe or spool type transducer whose output is coupled through a preamplifier to a sampling switch. The output of the sampling switch is processed by a signal processing amplifier and then coupled through a phase sensitive demodulator to utilization circuits. To reduce the effect of spurious signals, a storage device is connected at the output of the phase sensor demodulator, such as a capacitor. The effect of the spurious voltages is eliminated by first detecting the presence of a spurious voltage or occurrence of an event capable of producing a spurious voltage and then disabling the phase sensitive demodulator so that the signal previously applied to the utilization circuits, which is also stored on the storage device, is maintained during the presence of the spurious voltages. In one form of the invention in which the electromagnetic flow meter is of the spool type, spurious voltages may be induced by triboelectric effects. Such voltages are sensed by comparing the absolute value of the signal against a reference. In another embodiment in which the flow meter may be of a probe type suspended in an open channel, spurious signals may be induced by vertical motion of the probe. Vertical velocity, when sensed, produces a signal to disable the phase sensitive demodulator. The disablement may be for either a predetermined period of time or only so long as the spurious voltage exists.

16 Claims, 5 Drawing Figures

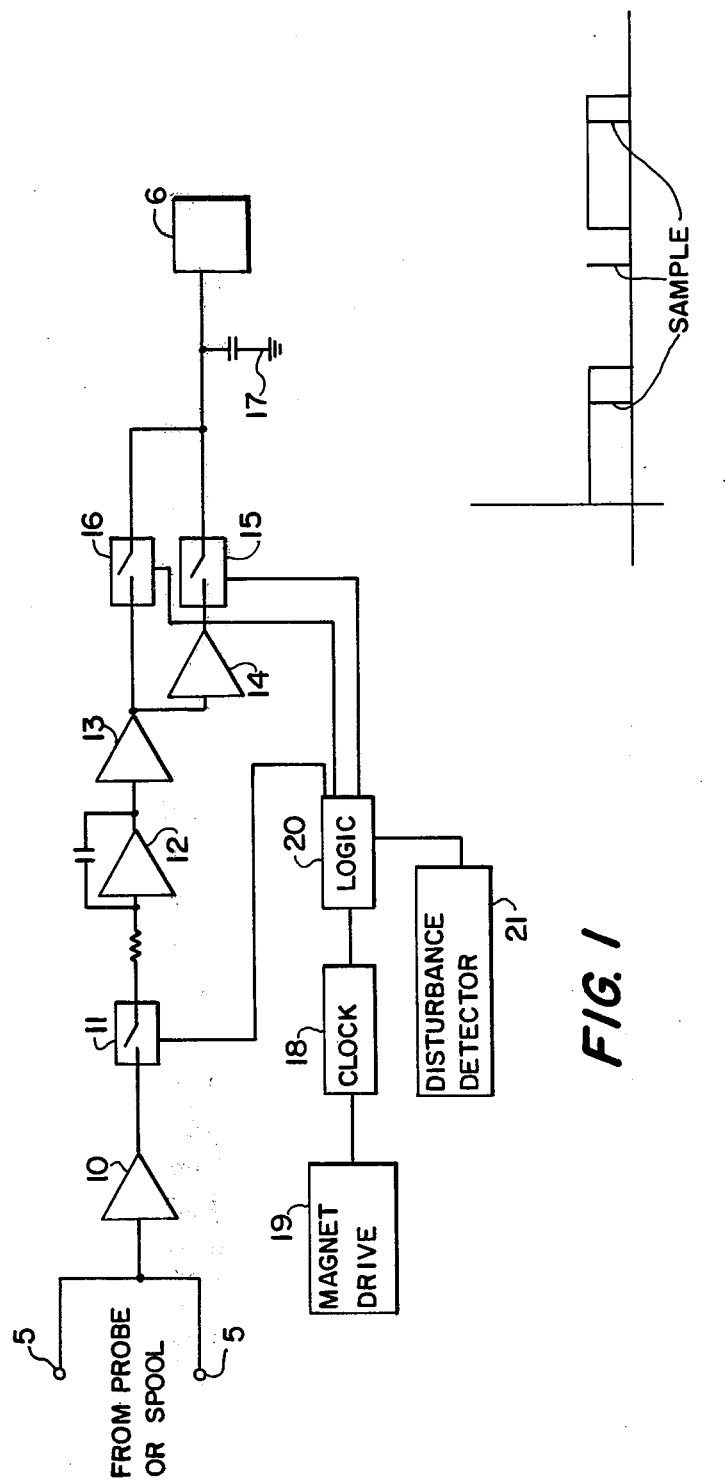

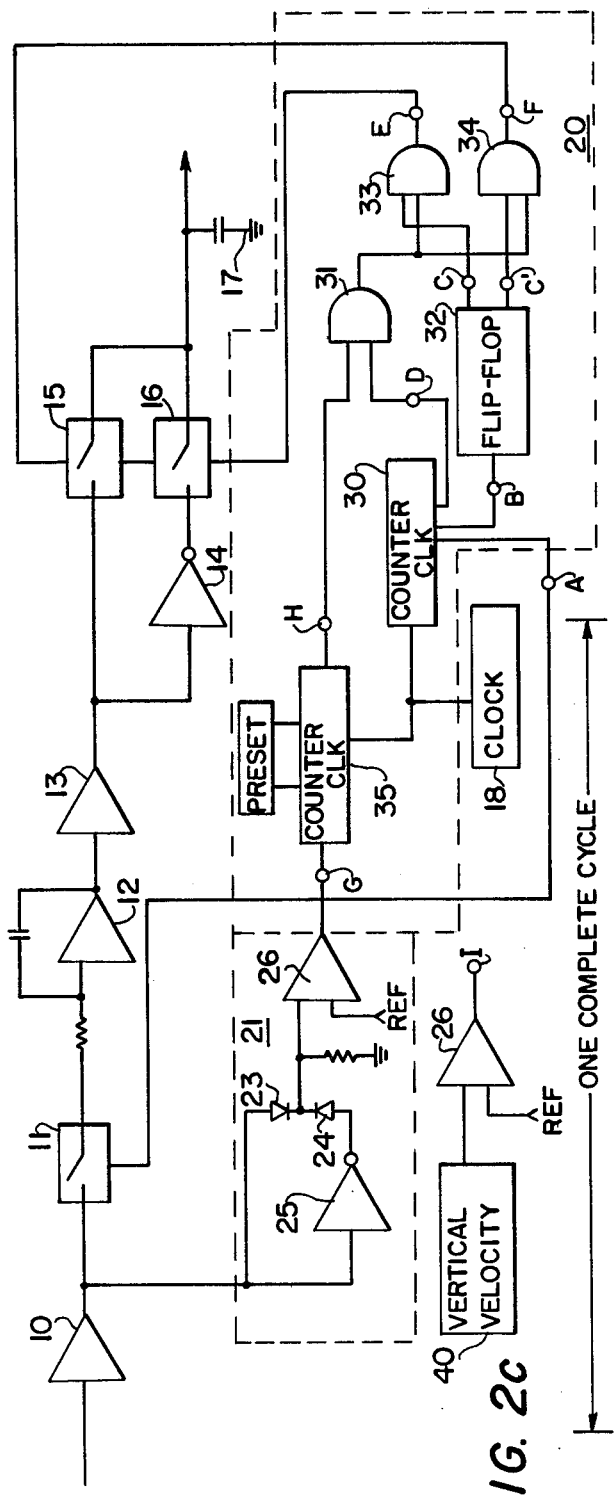
FIG. 2a
FIG. 2c
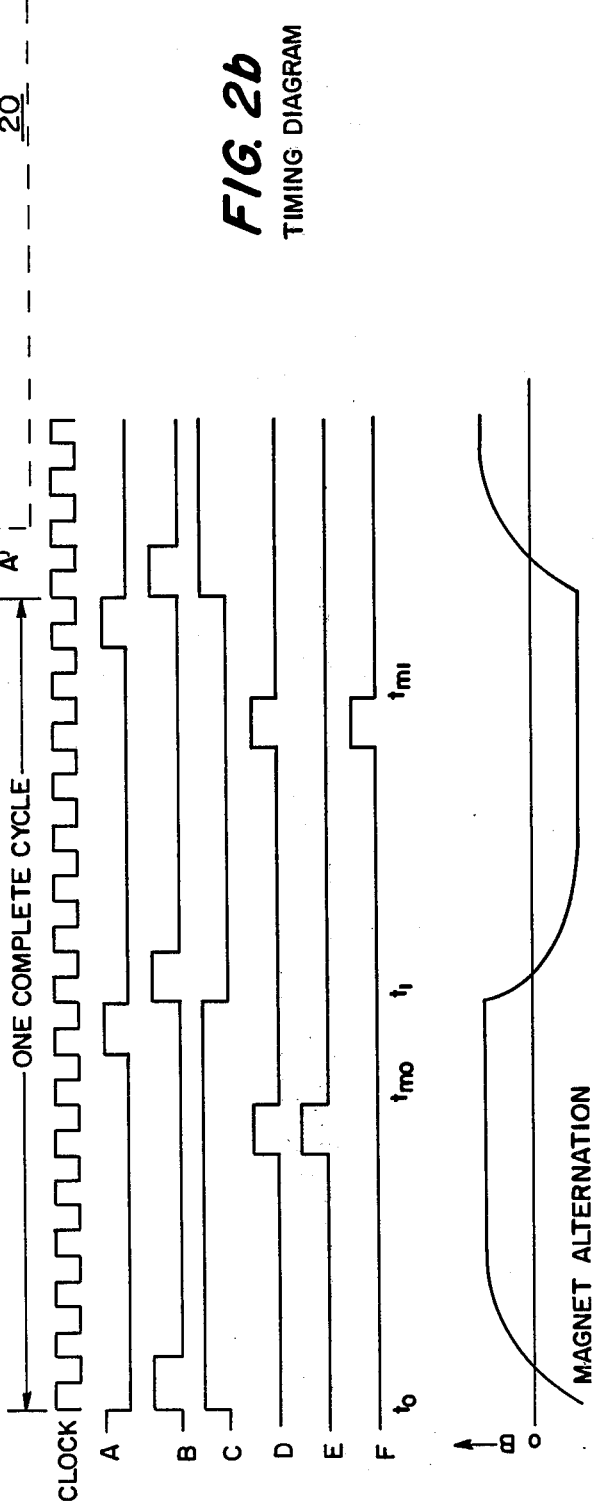
FIG. 2b
TIMING DIAGRAM

ELECTROMAGNETIC FLUID FLOW METER WITH TOLERANCE TO SPURIOUS SIGNALS

FIELD OF THE INVENTION

The present invention relates to the field of electromagnetic flow meters, either of the spool or probe type, and more particularly, such apparatus in which the effect of spurious voltages may be reduced.

BACKGROUND OF THE INVENTION

The electromagnetic flow meter is a device with a well developed body of art in which techniques are available for measuring flow velocity of various types of fluids in various environments. In one environment in which the flow is confined to a conduit, the flow meter includes what is known as a spool type transducer in which an electromagnetic field is generated by a coil surrounding the conduit, and electrodes in contact with the flow have voltages induced therein representative of the flow velocity. Another type of known electromagnetic flow meter is of the probe type in which the flowing fluid is not confined to a conduit. In the probe type flow meter the transducer may take the form of a cylinder. The cylinder includes therein an electromagnetic coil for producing an electromagnetic field which is uniformly disposed about the periphery of the cylinder. Located in the vicinity of the surface of the cylinder are electrodes which have voltages induced therein representative of the flow velocity.

A constant source of problem in this field of technology is the low level of signals induced in the electrodes. For example, the spool type electrode is capable of generating signals on the order of 300 microvolts per foot per second of fluid flow velocity. The probe type transducer generates signals on the order of 25 microvolts per foot per second of fluid flow velocity. Obviously, voltages of this order of magnitude cannot be used directly and therefore it is conventional in the art to employ signal processing to increase the magnitude of the signal so that it may be utilized. A typical form of signal processing is shown in my U.S. Pat. Nos. 3,759,097 and 3,885,858.

Generally stated, the function of the signal processing circuitry is to focus on the flow induced voltages, and separate them from the effects of extraneous noise and amplify the flow induced voltages while ignoring the extraneous noise. While the signal processing techniques known in the art are quite effective, nevertheless, the extraneous voltages or noise voltages are still reflected in the output of the signal processing chain. The signal processing circuitry is effective to focus on the voltages periodically induced on the electrodes such that random noise which is of the same order of magnitude or even slightly greater than the flow induced voltages, is acceptedly rejected. However, when the noise signals are much greater than the flow induced voltages, they tend to saturate the active elements in the signal processing chain. The effect of saturation is to lose the output signal until the active elements come out of saturation. As a result, noise voltages of relatively large orders of magnitude cause signal dropouts which are disturbing to the user.

The triboelectric noise effects associated with flow measurements in dielectric fluids has been reduced, in the prior art, by operating the transducer at relatively high frequencies inasmuch as this noise spectrum decreases with frequency. However, low frequency operation of the transducer is desirable from a number of other standpoints. Therefore, it is important to be able to reduce the triboelectric noise or reduce its effects, with apparatus capable of relatively low frequency operation.

SUMMARY OF THE INVENTION

This problem is overcome in accordance with the teachings of the invention by adding several elements to the conventional signal processing chain for the flow meter. Conventionally, the flow meter includes a preamplifier coupled to the transducer electrodes, and a sampling switch at the output of the preamplifier. The sampling switch, in turn, is coupled to active signal processing elements, for example, an integrator and buffer, the output of which is then provided to a phase sensitive demodulator, the output of which is then available for utilization circuitry. To this apparatus the present invention adds a storage device such as a capacitor coupled across the output line so as to maintain the demodulator output available to the utilization circuits. In addition, a disturbance detector is provided which is able to sense extraneous noise voltages or the conditions which would lead to extraneous noise voltages, and the disturbance detector is provided to disable the phase sensitive demodulator upon occurrence of an extraneous noise voltage or a condition which would lead to such an extraneous noise voltage. The storage device or capacitor, coupled to the utilization circuits, maintains the output of the phase sensitive demodulator which was produced prior to the disturbance event and disablement of the phase sensitive demodulator prevents the noise voltages from affecting the utilization circuitry. Upon the occurrence of a disturbance event the phase sensitive demodulator may be disabled for a predetermined duration or, on the other hand, may be disabled for only so long as the disturbing event is sensed.

In one form of the invention, applicable to spool type transducers, especially those arranged to sense flow velocity in dielectric fluids, triboelectric noise effects may result in voltages three to ten times greater (or more) than flow induced voltages. Accordingly, a threshold detector is arranged in the signal processing chain to compare the absolute value of the signal in the signal processing chain with a threshold. When the threshold is exceeded, the phase sensitive demodulator is disabled.

In another form of the invention, in which a probe type electromagnetic flow meter is suspended from the surface of an open body of fluid, extraneous noise voltages may be induced as a result of vertical motion of the probe due to surface effects such as waves, etc. The probe transducer cannot distinguish between voltages induced by reason of the flow past the probe due to fluid flow from flow velocities induced by reason of probe motion, and the probe merely provides an output representative of the vector sum of these components. Probe transducer motion due to waves is cyclic and thus its velocity varies periodically. Desirably, the phase sensitive demodulator is disabled only when the probe velocity exceeds some threshold. This can be sensed by, for example, providing an accelerometer in the probe arranged to sense vertical acceleration, integrating the output of the accelerometer and comparing the signal corresponding to vertical velocity with a reference. When the vertical velocity exceeds the reference, the phase sensitive demodulator is disabled. Alternatively, an auxiliary flow meter can be provided arranged to sense only vertical flow velocity. When this vertical flow velocity exceeds a threshold, the phase sensitive demodulator in the main flow meter signalling chain is disabled.

Once disabled, the phase sensitive demodulator can be maintained disabled for a predetermined duration; determined empirically depending upon the application. On the other hand, the demodulator may be maintained disabled only for so long as the disturbing event is present.

BRIEF DESCRIPTION OF THE DRAWINGS

The present invention will now be disclosed to enable those skilled in the art to make and use the same in connection with the attached drawings in which like reference characters identify identical apparatus and in which:

FIG. 1 is a block diagram illustrating the inventive components;

FIG. 2A is a block diagram of one embodiment of the invention, FIG. 2B is a timing chart showing the signal present during a typical cycle of operation;

FIG. 2C is a block diagram illustrating the variations in FIG. 2A to provide a second embodiment of the invention;

FIG. 3 illustrates the square wave representing operation of the magnet drive and also the preferable sampling times.

DETAILED DESCRIPTION OF PREFERRED EMBODIMENTS

FIG. 1A shows a typical signal processing chain for an electromagnetic flow meter enhanced in accordance with the present invention. More particularly, a preamplifier 10 has an input coupled to a probe or spool type transducer. Specifically, the amplifier 10 input is coupled to sensing electrodes 5 on the transducer. The output of amplifier 10 is coupled to a sampling switch 11 which enables the output of amplifier 10 to be periodically coupled to the remaining signal processing components. These include an integrator 12 in the form of an operational amplifier coupled to a buffer 13. The use of an integrator and buffer are not essential and other signal processing elements can be substituted in lieu thereof. The output of the buffer 13 is provied to a phase sensitive demodulator which comprises an inverter 14 coupled to the output of the buffer 13 which in turn provides an input to a sampling switch 15. A second sampling switch 16 is coupled to the output of the buffer. The output of the sampling switches 15 and 16 are tied together and are provided to the utilization circuits 6. As thus far explained, the signal processing is entirely conventional.

In accordance with the invention, a signal storage device is coupled to the output of the phase demodulator. Such a signal storage device is represented in FIG. 1 by the capacitor 17. In order to operate the sampling switches 11, 15 and 16, a clock 18 is provided. A logic circuit 20 is coupled to the output of clock 18 and provides signals for operating sampling switches 11, 15 and 16, synchronous with magnet drive 19, which is also driven by the clock 18. FIG. 3 illustrates the square wave representing operation of the magnet drive 19 and also the preferable sampling times which are in effect the times at which the sampling switch 11 is closed. As is conventional, the sampling switches 15 and 16 are closed at a time in the cycle subsequent to the closure of the switch 11 and switches 15 and 16 operate alternately in different half cycles of the magnet drive.

Finally, as shown in FIG. 1, a disturbance detector 21 is provided which provides an output to the logic circuit 20. At times during which a disturbance is detected, the signal provided by the disturbance detector 21 to the logic circuit 20 disables the phase sensitive demodulator by inhibiting operation of the switches 15 and 16.

In operation, assuming no disturbing event has been detected, the sampling switch 11 is operated twice per cycle of the magnet drive, and the switches 15 and 16 are operated once per cycle of the magnet drive in phase opposition with each other. The output of the phase sensitive demodulator is provided to the utilization circuits and also stored on the capacitor 17. Each closure of one of the switches 15 or 16 adjusts the voltage stored on the capacitor 17 to reflect real time conditions. When a disturbing event is detected, namely an event such as to produce voltages which could seriously disturb or saturate the signal processing circuitry and possibly cause signal dropout, the disturbance detector 21 so signals the logic circuit 20. As a result of this, the logic curcuit 20 inhibits closure of either of the switches 15 or 16. This prevents adjustment of the voltage on capacitor 17 and the signal level stored on the capacitor 17 just prior to detection of such a disturbing event is maintained. The signal level is maintained until the phase sensitive demodulator is allowed to once again operate. In accordance with the invention, the phase sensitive demodulator may be inhibited for a predetermined duration following detection of a disturbing event or may be inhibited only during the processing of a signal resulting from a disturbing event.

FIG. 2A illustrates a specific embodiment of the invention which can be applied with spool type transducers arranged to sense flow velocity in a dielectric medium. Such media exhibit triboelectric effects in which random voltages, many times the order of magnitude of the flow induced voltages, can be sensed by the electrodes of the transducer. Much of the circuitry shown in FIG. 2A is identical to that shown in FIG. 1 and accordingly, a description thereof will not be repeated here. As shown in FIG. 2A, however, the disturbance detector 21 comprises a circuit coupled to the output of the preamplifier 10. More particularly, the disturbance detector 21 comprises a circuit to sense the absolute value of the voltage in the signal processing chain, compare that value with a reference, and if the detected value exceeds the reference, signal the logic circuit 20 to disable the phase sensitive demodulator.

Since the preamplifier is adequately wide band, it faithfully reproduces noise, and its output is the best point to sense for disturbing voltage—particularly saturating noise pulses. However, those skilled in the art will understand that under certain circumstances it may be preferable to sense for excess noise at the preamplifier and/or other points (including the input to the preamplifier—in our discussion of noise voltage sensing, the input and output of the preamplifier are the same; only the impedance level is different) in the processing chain which are in front of the phase sensitive demodulator.

In the embodiments shown here we have chosen to store or remember prior flowmeter signal information in the hold capacitor attached to the output of the phase sensitive demodulator. One skilled in the art will realize that other methods of storage or memory can be used; the important matter being that the signal information is not conveyed to memory (e.g. by closure of demodulator switches 15 or 16) until after the signal channel has been disconnected (e.g. by opening of sampling switch 11) from the source of signal and noise. Disturbance information available up to the time of disconnect (opening of switch 11) is used by the system's logic to decide whether to admit the most recent signal information to memory, for conveyance to the utilization circuits.

Returning to the disturbance detector 21, it comprises an absolute value circuit including a diode 23 whose anode is coupled to the output of the preamplifier 10 and whose cathode is coupled to the cathode of a diode 24. An inverter 25 has an input also coupled to the output of the preamplifier 10, and an output coupled to the anode of the diode 24. The junction of the cathodes of diodes 23 and 24 is coupled to the input of a comparator 26. The other input to the comparator is provided by a reference level. So long as the absolute value of the flow induced voltages do not exceed the reference, the output of comparator 26 will be nominally at zero. However, if the absolute value of the flow induced voltages exceeds the reference, comparator 26 will provide an output to the logic circuit 20.

As shown in FIG. 2A, the logic circuit 20 includes a counter 30 coupled to the output of the clock 18. Counter 30 divides the clock output by a suitable quantity, for example/8. The counter 30 also includes a decoder such that its outputs correspond to different portions of the cycle established by the count to which the counter 30 is capable of counting. Different ones of these outputs are provided to different elements. For example, FIG. 2B illustrates the clock output, and also illustrates an A output thereof. It will be seen that the A output is repeated twice per cycle. The A output is provided the driving input for the sampling switch 11. A flip-flop 32 is provided which is clocked by the B output of the counter 30. The B output is also shown in FIG. 2B as occurring somewhat later in the cycle from the A output. Flip-flop 32 provides two outputs C and $\overline{C}$. The C output is illustrated in FIG. 2B, and the $\overline{C}$ output is the inverse. An AND gate 33 receives as one input the C output of the flip-flop 32, and AND gate 34 receives the $\overline{C}$ output. The D output of the counter 30, also shown in FIG. 2B, is provided as one input to an AND gate 31. Another input to AND gate 31 is provided by a second counter 35. Counter 35 is also clocked by the clock 18 but is normally maintained in the reset position whence it provides an output to the AND gate 31. The output of AND gate 31 is provided as the second input to each of the AND gates 33 and 34. Accordingly, the output of AND gate 33 is the E signal, shown in FIG. 2B and the output of AND gate 34 is the F signal, also shown in FIG. 2B. The E signal drives sampling switch 16 and the F signal drives sampling switch 15. Accordingly, one of the sampling switches 15 or 16 is operated during each half cycle of the clock, and on the next following half cycle of the clock, the other sampling switch is operated; the operation of the sampling switch occurs at the time of the D signal.

Upon the occurrence of a disturbing event, resulting in an output from the comparator 26, the counter 35 is preset to a predetermined count by the signal G. The presetting of counter 35 removes the H signal and thus the AND gate 31 is inhibited from producing its output and accordingly, the output signals E and F are also inhibited. This inhibition of the output signals E and F, and thus the inhibition of the phase sensitive demodulator, continues until the counter 35 counts back to its reset position. Since the clock period 18 is fixed, the period of the inhibition is determined by the count to which the counter is preset upon the G signal. When the counter has counted back to its reset position, the H signal again occurs, the inhibition is terminated and the sampling switches 15 and 16 can then continue to operate.

Accordingly, the counter 35, and more particularly, the count to which it is preset, determines the period of time during which the phase sensitive demodulator is inhibited. When the counter has counted back to its reset position, allowing the H signal to be produced to terminate the inhibition of the phase sensitive demodulator, the G signal, if still present, will cause the counter to again be preset and prevent operation of the phase sensitive demodulator for an additional period of time. This operation will continue until the G signal terminates.

With reference to FIG. 2B, any disturbance deemed excessive during the one half cycle terminating in $t_0$ (the A strobe) will activate the processing chain's logic so as to inhibit the demodulator switch's drive or strobe which terminates at time $t_{mo}$ (the E strobe); and disturbance deemed excessive in the one half cycle terminating in time $t_1$ (the A strobe) will activate the logic to inhibit the sampling drive or strobe terminating in time $t_{m1}$ (the F strobe). As discussed above, the auxiliary counter 35 provides the necessary delay to perform this function. Indeed, the auxiliary counter 35 may preferably be set to maintain inhibition for one or more complete cycles of the electromagnetic flowmeter's magnet alternation in order to allow ample time for the electromagnetic flowmeter's and signal processing chain's recovery from the excessive disturbance. Less preferably, instead of a clocked auxiliary counter 35, an alternative inhibition persistance means is to replace the counter 35 with a one-shot having predetermined time-delay. The one-shot's time delay depends on the application; indeed if it is short enough, one can omit the one-shot entirely, in which case inhibition will last only for the duration of the excessive disturbance.

In another embodiment of the invention, a probe type transducer is supported along a mooring line beneath a buoy in an open body of water such as the ocean. The probe type transducer is intended to sense the horizontal components of ocean current. Typically, wave motion will cause the buoy to surge or translate vertically. Since the probe type transducer is supported from the buoy, the probe will undergo a surge component of motion. Were the probe type transducer ideal and thus completely insensitive to the surge component of velocity, it could correctly measure the horizontal components of ocean current during surge. In practice, however, the probe type transducer measures most accurately when the surge component of velocity is small compared with the horizontal flow. Hence, the present invention can be used to sense the surge component of velocity, and disable the flow instrument's demodulators (i.e. withhold flow signal information from memory) when the surge velocity is deemed excessive. Since the surface wave motion (and hence the surge motion) is periodic, the times during which the probe is subjected to large surge velocity (let us, for simplicity, call it vertical velocity) is limited.

The invention can be employed to reduce the effect of the large vertical velocity component as follows. In the circuit of FIG. 2A, the diodes 23, 24, and the inverter 25 are removed and a vertical velocity sensor 40 (seen in FIG. 2C) is employed. The output of the vertical velocity sensor is provided as an input to the comparator 26 where it is compared with a reference voltage. If the vertical velocity component exceeds, in absolute value, the reference, then the comparator 26 produces the G signal which is coupled to the counter 35 in FIG. 2A. The vertical velocity sensor 40 may comprise an accelerometer mounted in the probe transducer arranged to sense vertical acceleration. The output of the accelerometer is provided to an integrator, whose output is therefore representative of vertical velocity. An absolute value circuit, conventional in the art, may be employed to eliminate signal polarity. As an alternative to the accelerometer, an auxiliary electromagnetic flow meter is included in the probe arranged to sense vertical motion of the probe or vertical flow velocity. Such auxiliary flow meter requires an auxiliary coil to provide the necessary electromagnetic field. The electrodes on the probe transducer can be time shared between the main and auxiliary channels and signal processing circuitry may be included such as that shown in my prior patents. The output of such an auxiliary flow meter is a vertical velocity signal which can be coupled to the comparator 26 as shown in FIG. 2C. Instead of employing the absolute value of vertical velocity, a ratio can be taken between vertical velocity and total flow velocity and inhibiting the demodulator only when the absolute value of the ratio exceeds the reference value. A signal related to this ratio can be obtained with a conventional divider circuit.

In accordance with this embodiment of the invention, the disturbing event is sensed separate and apart from the signal voltage in the signal chain.

The application of the invention is not restricted to the applications described herein, and the signals generated by the apparatus of FIG. 2A, for example, can be employed for other purposes as well. In my co-pending application Ser. No. 807,288, I disclosed a debris shedding electromagnetic flow transducer. As mentioned in that disclosure, the transducer may include a scrubbing jet to provide a source of cleaning fluid such as water, air or other fluid directed at the surface of a probe type transducer mounted at an angle to the direction of flow. As mentioned in that application, the scrubbing jet may be energized periodically. In such an arrangement, the energization of a scrubbing jet may comprise a disturbing event and the signal energizing the scrubber may be employed as the G signal of FIG. 2A. Alternatively, the apparatus shown in FIG. 2A may be employed, and when a G signal is produced, it may, in addition to operating the components shown in FIG. 2A, also be used to energize the scrubbing jet.

What is claimed is:

1. An electromagnetic flow meter for measuring fluid flow velocities by use of electromagnetically induced voltages having a signal processing chain including sensing electrodes and an amplifier coupled thereto, a sampling switch coupled to said amplifier for sampling said amplifier, signal processing means coupled to said sampling switch, a phase sensitive demodulator coupled to said signal processing means and at least one utilization circuit coupled to said phase sensitive demodulator, wherein the improvement comprises means for disabling said demodulator in the presence of spurious signals and a storage device for providing to said utilization circuit a signal representative of flow velocity prior to the disablement of said phase sensitive demodulator.

2. The apparatus of claim 1 in which said means for disabling said demodulator comprises a signal responsive means having an input coupled to said signal processing chain.

3. The apparatus of claim 2 in which said signal responsive means is coupled to a wide band portion of said signal processing chain.

4. The apparatus of claim 1 in which said means for disabling said demodulator in the presence of spurious signals disables said demodulator for at least a predetermined time.

5. The apparatus of claim 1 which further includes
a magnet drive for producing a magnetic field,
said means for disabling including logic means having a clock and coupled to and driving said magnet drive,
said logic means also coupled to and controlling said phase sensitive demodulator.

6. The apparatus of claim 5 in which said logic means includes:
counter means driven by said clock for producing plural pulse outputs, each pulse output displaced from others of said pulse outputs,
bistable device responsive to a one of said pulse output for sequentially changing its condition,
a pair of gating means, each coupled to a different output of said bistable device,
a further gating means inhibited under conditions generating spurious signals, said further gating means providing an input for each of said pair of gating means,
said pair of gating means coupled to and controlling said phase sensitive demodulator.

7. The apparatus of claim 6 in which said phase sensitive demodulator comprises:
a first switching means coupled to said signal processing means,
an inverter coupled to said signal processing means,
a second switching means coupled to said inverter,
a first of said pair of gating means coupled to said first switching means and a second of said pair of gating means coupled to said second switching means.

8. The apparatus of claim 7 in which said means for disabling also includes:
an absolute value circuit coupled to said signal processing chain with an output and a comparator for comparing said output to a reference level, said comparator controlling inhibiting of said further gating means when said output exceeds said reference level.

9. The apparatus of claim 8 in which delay means is coupled between said comparator and said further gating means for delaying termination of said inhibiting.

10. The apparatus of claim 9 in which said delay means includes:
a second counter normally held in a reset state and preset to a predetermined count by said comparator, said clock coupled to said second counter for counting said second counter from said preset to said reset state.

11. The apparatus of claim 8 in which said absolute value circuit is connected to said amplifier.

12. The apparatus of claim 11 in which said sensing electrodes are located on a spool transducer for sensing flow in a closed conduit.

13. The apparatus of claim 7 in which said sensing electrodes are mounted on a probe transducer subject to spurious vertical movement in which said means for disabling includes:

a vertical velocity sensor and a comparator having as one input a signal related to vertical velocity and another input a reference level, said comparator controlling inhibiting of said further gating means when said one input exceeds said reference level.

14. The apparatus of claim 13 in which said delay means is coupled between said comparator and said further gating means for delaying termination of said inhibiting.

15. The apparatus of claim 14 in which said delay means includes:

a second counter normally held in a reset state and preset to a predetermined count by said comparator, said clock coupled to said second counter for counting said counter from said preset to said reset state.

16. An electromagnetic flowmeter for measuring fluid flow velocities by use of electromagnetically induced voltages having a signal processing chain including sensing electrodes and an amplifier coupled thereto, a sampling switch coupled to said amplifier for sampling said amplifier, signal processing means coupled to said sampling switch, a memory means connected through a connect/disconnect switch to said signal processing means and at least one utilization circuit coupled to said memory means, wherein the improvement comprises means disconnecting said memory in the presence of spurious signals, the memory then continuing to provide utilization circuits with a signal representative of flow velocity extant prior to disconnection of the said memory means.

* * * * *